Figure 1:
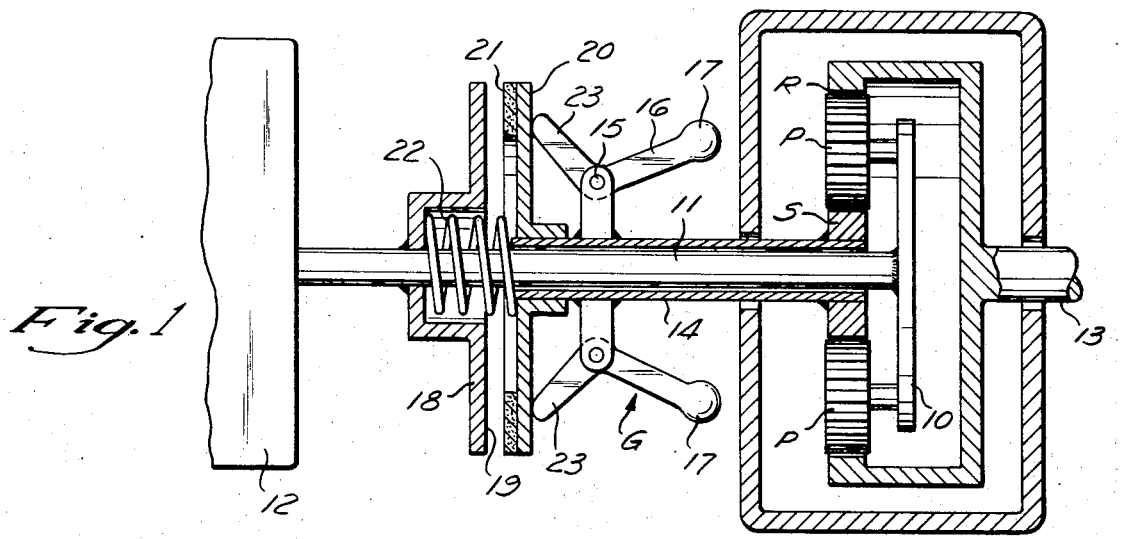

United States Patent
Lumb

[15] 3,699,826
[45] Oct. 24, 1972

[54] VARIABLE RATIO TRANSMISSION
[72] Inventor: Edwin T. Lumb, 530 N. W. 144th Street, Miami, Fla. 33168
[22] Filed: Feb. 25, 1971
[21] Appl. No.: 118,701

[52] U.S. Cl. .................................. 74/752 E, 74/763
[51] Int. Cl. ........................... F16h 5/46, F16h 57/10
[58] Field of Search ........................ 74/752 E, 762 E

[56] References Cited
UNITED STATES PATENTS

| | | |
|---|---|---|
| 885,207 | 4/1908 | Whitcomb ................ 74/752 E |
| 2,283,284 | 5/1942 | Owner ...................... 74/752 E |
| 2,045,611 | 6/1936 | Padgett .................... 74/752 E |
| 1,781,924 | 11/1930 | Johnson ................... 74/752 E |
| 2,011,101 | 8/1935 | Dodge ...................... 74/752 E |
| 2,059,517 | 11/1936 | Friedlein .................. 74/752 E |
| 2,546,863 | 3/1951 | Moore ...................... 74/752 E |

*Primary Examiner*—Carlton R. Croyle
*Assistant Examiner*—Thomas C. Perry
*Attorney*—Settle & Oltman

[57] ABSTRACT

Variable ratio, planetary gear-type transmission having the input drive coupled to a rotatable carrier for the planet gears, the output driven by the ring gear, and a governor for regulating the speed of the sun gear. A torque coupling which accommodates slippage acts between the sun gear and the input drive, under the control of the governor, to control the gear ratio.

10 Claims, 2 Drawing Figures

PATENTED OCT 24 1972　　3,699,826

INVENTOR.
EDWIN T. LUMB
BY
SETTLE & OLTMAN

ATTORNEYS

VARIABLE RATIO TRANSMISSION

This invention relates to a variable ratio transmission of the planetary gear type which is particularly suitable for use in automotive vehicles.

A principal object of this invention is to provide a novel and improved variable ratio transmission which is comparatively simple in construction and operation, enabling ready inspection and replacement of the parts which are subject to wear.

Another object of this invention is to provide a novel and improved planetary gear-type transmission in which the input drive is imparted to a rotatable carrier for the planet gears, the output is driven by the ring gear, and the sun gear's rotation is restrained by a torque coupling which imparts the sun gear's torque back to the input drive, while permitting slippage between them, as long as the input drive is slower than the sun gear's speed.

Another object of this invention is to provide a novel and improved transmission as just described which may incorporate relatively simple and reliable overdrive and reverse controls.

Further objects and advantages of this invention will be apparent from the following detailed description of two presently preferred embodiments thereof, which are illustrated schematically in the accompanying drawing.

Figure 2:
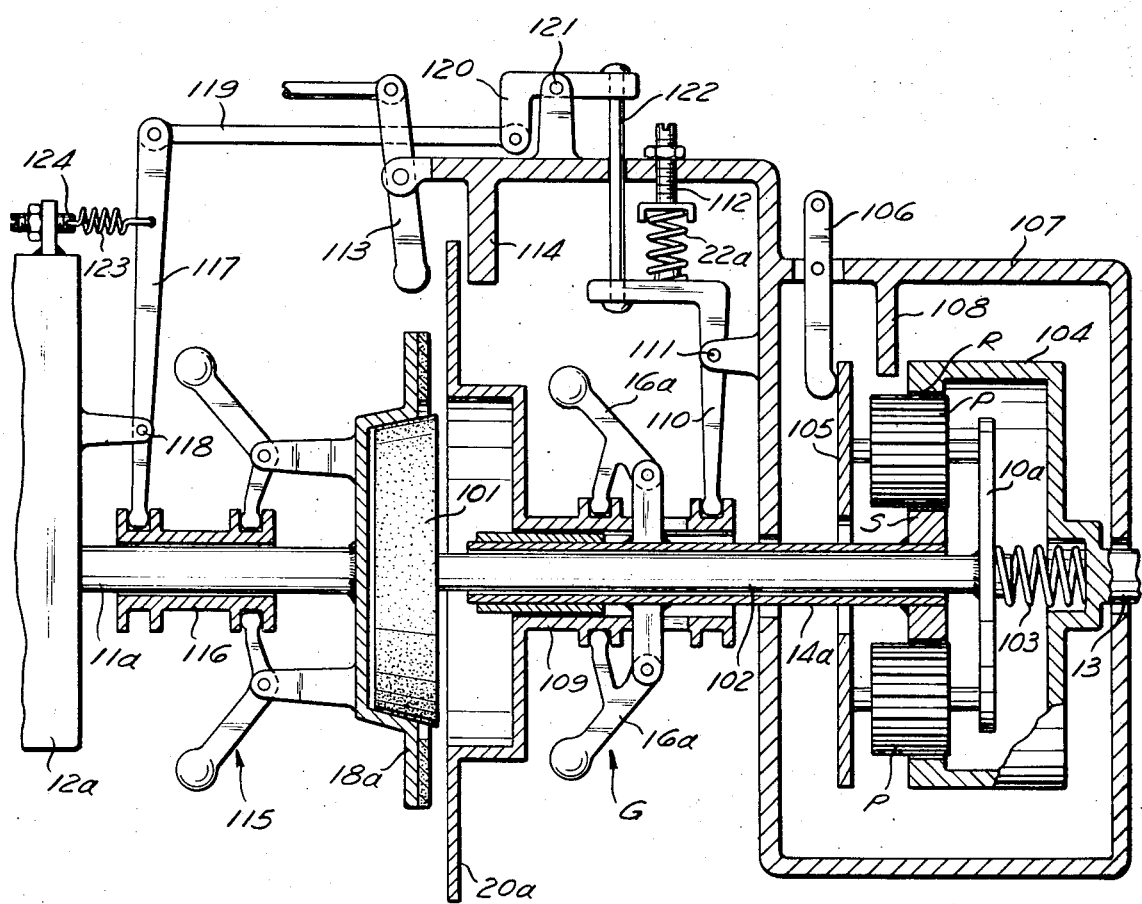

In the drawing:

FIG. 1 is a simplified longitudinal sectional view of a first embodiment of the present invention; and FIG. 2 is a similar view of a second, more elaborate and more complete embodiment of the present invention.

FIGURE 1

Referring first to FIG. 1, in the simplified embodiment illustrated there the transmission includes three planet gears P rotatably supported individually by a carrier 10 which is attached to an input shaft 11 driven by engine 12, which may be the engine of an automotive vehicle. The planet gears P are in meshing engagement with a rotatable sun gear S, and they are evenly spaced apart circumferentially around the sun gear. A ring gear R extends around and meshingly engages the three planet gears P. The ring gear is directly attached to a rotatable output shaft 13.

The sun gear S is rigidly attached to one end of a cylindrical sleeve 14 that is rotatably mounted on the input shaft 11 in any suitable fashion. Attached to this sleeve is a centrifugal fly-ball governor G of conventional design. In the simplified embodiment shown, this governor includes a plurality of pivoted, generally L-shaped arms 16 carrying weights 17 on their outer ends remote from their respective pivots 15. Rotation of the sleeve 14 tends to cause these weighted ends of the arms to move outward centrifugally, thereby causing the arms to turn on their pivots.

To the left of the governor G in FIG. 1 a torque-sustaining plate 18 is rigidly attached to the drive shaft 11, presenting an annular, flat frictional-engagement face 19 that faces to the right. A second torque-sustaining plate 20 is splined to the sleeve 14 for sliding movement longitudinally of the sleeve while at the same time rotating in unison with the sleeve. Plate 20 carries an annular friction pad 21 facing toward the frictional-engagement face 19 of plate 18. A coil spring 22 is engaged under compression between the two torque-sustaining plates 18 and 20, normally biasing plate 20 to the right to a position out of engagement with plate 18.

The weighted arms 16 of the centrifugal governor G present transverse feet 23 disposed on the opposite side of the respective pivots from the weights 17. As the sleeve 14 rotates and the governor weights 17 tend to move outward centrifugally, the pivotal movement of the arms 16 forces their respective feet 23 against the back of the slidable plate 20 to move the latter to the left in FIG. 1.

In the operation of this transmission, at any input shaft speed below what is required to force plate 20 into substantial torque-transmitting engagement with plate 18, the sun gear S is rotated freely by the planet gears P. It will be understood that the gear ratios are such that the sun gear S rotates faster than the input shaft 11. The load on the output shaft 13 prevents the ring gear R from being driven by the planet gears. The sun gear S and plate 20 rotate in the same direction as the input shaft 11 and plate 18.

At some critical input speed determined by the bias force exerted by spring 22, the governor G will force the slidable plate 20 into frictional, torque-transmitting engagement with the plate 18 driven directly by the input shaft. This critical speed will be called the engagement speed. Since at this time the sun gear S is rotating faster than the input shaft 11, there is frictional slippage between plates 20 and 18 (both of which continue to rotate in the same direction). The sun gear torque is coupled back to the input shaft 11 through the frictional, torque-sustaining coupling provided by plates 20 and 18. The slower-rotating plate 18 tends to exert a braking or retarding effect on the faster-rotating plate 20.

This frictional, torque-absorbing loading effect between plates 20 and 18 causes the planet gears P to rotate the ring gear R and the output shaft 13. At the engagement speed and throughout a range of input speeds above the engagement speed, the combined effect of the governor G and the frictional engagement of plates 20 and 18 is to hold the sun gear's rotational speed substantially constant, while the planet gear carrier 10 rotates in unison with the input shaft 11. The rotational speed of the ring gear R and the output shaft 13 increases with increasing input speeds. The gear ratio decrease progressively as the engine speed increases.

Finally, when the rotational speed of the input shaft 11 reaches this constant speed at which the sun gear S is rotating, there is a 1-to-1 drive between the input shaft 11 and the sun gear S.

FIG. 2

FIG. 2 illustrates a more complete and more elaborate transmission in accordance with the present invention which operates in substantially the same general fashion as the FIG. 1 embodiment. Elements of the FIG. 2 transmission which correspond to those in FIG. 1 are given the same reference numerals as their FIG. 1 counterparts, but with an "a" suffix added.

In FIG. 2 the engine-driven drive shaft 11a is releasably coupled to the planet gear carrier 10a through a friction clutch which comprises a cup-shaped portion of plate 18a and a truncated cone 101 attached to a shaft 102 on which the planet gear carrier 10a is mounted. A compression spring 103, acting between shaft 102 and the ring gear carrier 104, normally maintains the cone clutch 101, 18a engaged. The unitary assembly of shaft 102, cone clutch member 101, planet gear carrier 10a and planet gears P is shiftable axially to permit the engagement or disengagement of the cone clutch, as described hereinafter.

To the left of the planet gears P is FIG. 2 the planet gear carrier 10a rigidly supports an annular plate 105 which is engageable by the inner end of a pivoted reversing lever 106. The housing 107 which encloses the gears presents a fixed stop 108 against which the plate 105 is pushed when the reversing lever 106 is pivoted counterclockwise in FIG. 2. When this action takes place the planet gear carrier 10a is braked against rotation.

As is the FIG. 1 embodiment, the governor G is coupled to the sleeve 14a which carries the sun gear S, so that the governor rotates in unison with the sun gear. The torque-sustaining plate 20a is attached to a sleeve 109 which is splined to sleeve 14a to rotate in unison with sleeve 14a but to be slidable longitudinally thereon. The weighted arms 16a of the governor G are suitably coupled to sleeve 109 to urge plate 20a to the left as the rotational speed of the sun gear increases.

A bellcrank lever 110 has its inner end similarly coupled to sleeve 109. At the opposite side of its pivot 111 the bellcrank lever is engaged by the inner end of the bias spring 22a. The outer end of this spring is engaged by an adjusting screw 112 threadedly mounted at a complementary opening in the housing. The adjustment of this screw determines the compression of spring 22a and therefore determines the bias force which the spring exerts (through lever 110) against sleeve 109, tending to maintain plate 20a away from plate 18a.

To the left of plate 20a the housing pivotally supports an overdrive lever 113, whose inner end is engageable with plate 20a to force it against a fixed stop 114 on the housing. This action takes place when lever 113 is pivoted counterclockwise in FIG. 2, and when this happens the sun gear S is braked to a stop.

The plate 18a which is driven directly by the engine 12a carries a centrifugal flyball governor 115, which is coupled to a sleeve 116 slidable along the drive shaft 11a such that sleeve 116 is displaced to the left in FIG. 2 as the engine speed increases. A lever 117, pivoted at 118 to the engine housing has its inner end coupled to sleeve 116 to follow the latter's movements along the drive shaft. The outer end of lever 117 is pivotally connected to the left end of a rigid rod 119. The opposite end of rod 119 is connected to a bellcrank lever 120 at one side of the latter's pivot. Lever 120 is pivotally supported at 121 on the housing. A vertical thrust rod 122 acts between the bellcrank lever 120 and the bellcrank lever 110 such that an upward pull exerted on rod 122 by lever 120 is imparted to lever 110 and a downward pull exerted on rod 122 by lever 110 is imparted to lever 120. A tension spring 123 acts between lever 117, near the latter's outer end, and an adjusting screw 124 threadedly mounted on the engine housing.

In the operation of FIG. 2, the cone clutch 101, 18a normally is engaged so that shaft 102 rotates in unison with the engine drive shaft 11a. At the engagement speed, the governor G forces the sleeve 109 to the left until plate 20a is brought into torque-sustaining relationship with the engine-driven plate 18a. In doing so the governor G overcomes the bias exerted by spring 22a, acting through the bellcrank lever 110.

As the engine speed increases, the engine-driven centrifugal governor 115 pushes sleeve 116 to the left along drive shaft 11a, overcoming the bias force exerted by tension spring 123 on lever 117. Such movement of sleeve 116 rocks the lever 117 clockwise, pushing rod 119 to the right and rocking the bellcrank lever 120 counterclockwise. This pulls the rod 122 up against the bias force exerted by spring 22a against the bellcrank lever 110. Consequently, the net bias force on lever 110 is reduced, enabling the governor G to urge plate 20a with greater force toward plate 18a.

Thus, governor 115 assists governor G in maintaining the frictional coupling between plates 20a and 18a. As the engine speed increases, a progressively greater retarding effect is exerted on the sun gear because of the increased frictional force acting between the slower-rotating plate 18a and the faster-rotating plate 20a. Stated another way, governor 115 modifies the bias force exerted by spring 22a so as to provide a better gear ratio at all engine speeds between the engagement speed and the speed at which a 1-to-1 ratio is established between the drive shaft 11a and the sun gear.

Overdrive may be established by rocking the lever 113 counterclockwise in FIG. 2, moving plate 20a away from plate 18a and back against the fixed stop 114, thereby braking the sun gear S to a stop.

A reverse drive may be established by rocking the lever 106 counterclockwise in FIG. 2, forcing plate 105 back against the fixed stop 108 to brake the planet gear carrier 10a to a stop. The entire assembly of plate 105, planet gear carrier 10a, planet gears P, shaft 102 and cone clutch member 101 is displaced axially to the right, so that the cone clutch 18a, 101 is disengaged. A 1-to-1 drive is imparted from the input drive shaft 11a through the frictional coupling 18a, 20a to the sun gear at this time.

While two illustrative embodiments of the present invention have been shown schematically and described in detail, it is to be understood that various modifications in, omissions from, or additions to the disclosed embodiments may be adopted without departing from the scope of this invention. For example, the torque-sustaining frictional coupling between the sun gear and the input shaft may be replaced by a different type of torque coupling which accommodates slippage between its relatively rotatable parts, such as a liquid coupling or a magnetic coupling. Also, in place of or in addition to the centrifugal governor, a control operated in response to the engine vacuum may be provided to couple the sun gear in a 1-to-1 relationship to the engine-driven input shaft under light engine load conditions at a lower speed than required to establish this 1-to-1 relationship under heavier engine loads. Also, if desired an overrunning clutch of known design may be connected between the sun gear and the housing to permit free rotation of the sun gear normally but to prevent reverse rotation of the sun gear when the engine is used for braking.

It may be noted that under low torque conditions, the flyball friction may lock in at low speed, say 20 m.p.h., but under high torque (wide open throttle) it would slip until the flyball unit reached higher r.p.m., giving a lower gear ratio and locking up only at high speed, say 45 m.p.h. Thus, modulation of the transmission can be built in by design of the flyball unit.

I claim:

1. In a variable ratio transmission having a rotatable sun gear, a rotatable ring gear driving an output shaft, rotatable planet gears engaged between the sun and ring gears, and a rotatable carrier for the planet gears, the improvement which comprises:

means for imparting an input drive to the planet gear carrier;

and means for regulating the rotational speed of the sun gear including:

a torque coupling which accommodates slippage acting between the sun gear and the input drive;

means for rendering said torque coupling operative to couple the sun gear to the input drive;

spring means opposing the engagement of said torque coupling; and means for reducing the opposing force exerted by said spring means as the input drive speed increases including a centrifugal governor driven by the input drive, and linkage means acting between said governor and said spring means.

2. A transmission according to claim 1, wherein said torque coupling is a friction clutch having relatively rotatable parts driven respectively by the input drive and the sun gear.

3. A transmission according to claim 1, wherein said means for regulating the sun gear's speed maintains its speed substantially constant over a range of speeds of the input drive.

4. A transmission according to claim 1, wherein said means for regulating the speed of the sun gear includes means for retarding the rotation of the sun gear.

5. A transmission according to claim 4, wherein said means for retarding acts between the input drive and the sun gear.

6. A transmission according to claim 5, wherein said means for regulating the speed of the sun gear maintains the sun gear's speed substantially constant over a range of input drive speeds.

7. A transmission according to claim 5, and further comprising spring means for disabling said means for retarding the sun gear's rotation until the sun gear reaches a predetermined rotational speed.

8. A transmission according to claim 7, wherein said spring means is adjustable.

9. A transmission according to claim 1 and further comprising means for selectively braking the sun gear against rotation to establish an overdrive condition.

10. A transmission according to claim 1, and further comprising means for selectively braking the planet gear carrier against rotation to establish a reverse drive condition.

* * * * *